United States Patent
Crotty et al.

(12)

(10) Patent No.: US 6,461,682 B1
(45) Date of Patent: Oct. 8, 2002

(54) COMPOSITION AND METHOD FOR INHIBITING CORROSION OF ALUMINUM AND ALUMINUM ALLOYS USING MERCAPTO SUBSTITUTED SILANES

(76) Inventors: David Crotty, 31 Woodside Park Blvd., Pleasant Ridge, MI (US) 48069; Justin Girard, 1042 Colt Dr., South Lyon, MI (US) 48178; Tarek Nahlawi, 2976 Mazin Ct., Yipsilanti, MI (US) 48197

( * ) Notice: Subject to any disclaimer, the term of this patent is extended or adjusted under 35 U.S.C. 154(b) by 0 days.

(21) Appl. No.: 09/802,087

(22) Filed: Mar. 8, 2001

(51) Int. Cl.⁷ .................................................. B05D 3/02
(52) U.S. Cl. ..................... 427/387; 427/388.1
(58) Field of Search .............................. 427/387, 388.1, 427/388.4

(56) References Cited

U.S. PATENT DOCUMENTS

| | | | |
|---|---|---|---|
| 5,108,793 A | 4/1992 | van Ooij et al. | 427/327 |
| 5,200,275 A | 4/1993 | van Ooij et al. | 428/623 |
| 5,292,549 A | 3/1994 | van Ooij et al. | 427/156 |
| 5,322,713 A | 6/1994 | van Ooij et al. | 427/327 |
| 5,750,197 A | 5/1998 | van Ooii et al. | 427/318 |
| 5,759,629 A | 6/1998 | van Ooij et al. | 427/384 |

FOREIGN PATENT DOCUMENTS

JP        03-034527    *   2/1991

OTHER PUBLICATIONS

Beccaria et al, Corros. Sci., 36(8), pp 1381–1393, 1994.*
Keohan et al, Annu. JT. Serv. Pollu., 3rd, 317–323, 1998.*
Underhill et al, Prog. Mech. Behav. Mater., 8th, vol. 2, 592–596, 1999.*
Matienzo et al., Polym. Mater. Sci. Eng., vol. 53, pp 562–600, 1985.*
Matienzo et al, ACS Symp., vol. 322, pp 234–249, 1986.*
Matienzo et al, J. Mater. Sci., 21(5), pp 1601–1608, 1986.*
Leung et al, J. Mater. Sci. Lett., 12(11), pp 844–846, 1993.*
Standard Test Methods for Measuring Adhesion by Tape Test, ASTM Designation D3359–87, 1987.
Chemical Conversion Coatings on Aluminum and Aluminum Alloys, Military Specification MIL–C–5541D, Nov. 30, 1990.
Material Safety Data Sheet, Silquest A–189 Silane, CK Witco Corporation, Feb. 2000.

* cited by examiner

*Primary Examiner*—Erma Cameron
(74) *Attorney, Agent, or Firm*—Carmody & Torrance LLP

(57) ABSTRACT

Corrosion of metal surfaces, particularly aluminum or aluminum alloy surfaces, is inhibited by contacting the metal surfaces with a solution comprising a mercapto-substituted silane and then preferably baking the metal to cure the silane coating. Multifunctional organo-mercapto-substituted silanes are preferred in the practice of the process. Preferably, the treatment solution is an aqueous mixture of the mercapto-substituted silane and selected solvents.

16 Claims, No Drawings

COMPOSITION AND METHOD FOR INHIBITING CORROSION OF ALUMINUM AND ALUMINUM ALLOYS USING MERCAPTO SUBSTITUTED SILANES

BACKGROUND OF THE INVENTION

The present invention relates to a composition and method for its use in preventing or inhibiting corrosion of metals, particularly aluminum and aluminum alloys. Treatment of the metal surfaces with the composition of this invention inhibits corrosion of that surface and also improves adhesion of subsequent organic coatings to the treated surface.

Many metals are susceptible to corrosion. In this regard, atmospheric corrosion is of particular concern. Such corrosion may affect the performance and/or appearance of the metals affected, and the products produced therefrom. In addition, when polymer coatings such as paints, adhesives or sealants are applied to the metal, corrosion of the underlying metal may cause a loss of adhesion between the polymer coating and the base metal. A loss of adhesion between the polymer coating and the base metal may similarly lead to corrosion of the metal. Aluminum and aluminum alloys frequently require corrosion protection and improvements in adhesion between the base aluminum (or aluminum alloys) and subsequent polymer coatings. Aluminum alloys, in particular, can be susceptible to corrosion since the alloying elements used to improve the metal's mechanical properties may decrease corrosion resistance.

Specifications for testing the effectiveness of the corrosion inhibition and adhesion promotion of various treatments have been established. Examples of the foregoing include ASTM standard D3359-87, Military specification MIL-C-5541D and ASTM standard B117.

Prior art techniques for improving corrosion resistance of metals widely employ the use of chromate conversation coatings to passivate the surface. Such chromate treatments are undesirable, however, because the chromium used is highly toxic, carcinogenic, and environmentally undesirable. Phosphate conversion coatings are also used, but generally provide substantially less corrosion protection unless used in conjunction with a chromate.

Recently, various techniques for eliminating the use of chromates in corrosion inhibition and adhesion promotion treatments have been proposed. U.S. Pat. No. 5,108,793 discusses treating the metal with an inorganic silicate followed by treating the silicate coating with a silane. U.S. Pat. No. 5,292,549 teaches the treatment of metals with a solution of a silane and a crosslinking agent in order to form a siloxane film for temporary corrosion protection.

U.S. Pat. No. 5,200,275 discusses treating a lead or tin coated steel surface with a silicate and a metal salt followed by a further optional treatment with a silane. U.S. Pat. No. 5,759,629 discusses the use of a hydrolyzed vinyl silane in a method for inhibiting corrosion on metal sheet. U.S. Pat. No. 5,322,713 discusses the treatment of metal sheet with an alkaline aluminate coating followed by a rinse with a hydrolyzed organofunctional silane.

U.S. Pat. No. 5,759,629 discusses treatment of a metal sheet with a hydrolyzed vinyl silane for corrosion inhibition. U.S. Pat. No. 5,750,197 discusses treatment of metals with a solution containing a multifunctional silane having at least two trisubstituted silyl groups, wherein the substituents are either alkoxy or acetoxy. An optional second treatment solution containing an organofunctional silane may also be employed, particularly if the metal is to be painted.

Many of the foregoing proposed techniques, however, have been proven to be ineffective, or to require time consuming, energy inefficient, multi-step processes. Thus, there remains a need for a simple, low cost, effective technique for inhibiting corrosion of metals, particularly for aluminum and aluminum alloys.

It is an object of this invention to provide an improved method of inhibiting corrosion of metals, especially aluminum and aluminum alloys, which is simple to apply, cost effective and environmentally friendly. It is another object of this invention to provide a treatment for metals which improves the adhesion of subsequent organic coatings to the metal while at the same time improving the corrosion resistance of the metal.

SUMMARY OF THE INVENTION

The foregoing objectives can be accomplished by treating a metal, particularly aluminum or aluminum alloys, with a treatment composition comprising a mercapto-substituted silane. The treatment composition is applied directly to the metal surface, preferably without any intervening treatment other than cleaning, deoxidizing or etching, by spray, flood or other means of direct contact. The treatment composition is preferably applied at room temperature and preferably has a pH between 3 and 5.

Preferably, the metal surface is cleaned, deoxidized and/or etched prior to treatment with the mercapto-substituted silane. A variety of known cleaners, deoxidizers and etchants may be employed for this purpose, with the appropriate choice being made with the specific metal surface to be prepared in mind.

Once the mercapto-substituted silane is applied to the metal surface the treated metal should be baked in order to dry and cure the coating. After curing, the treatment with the mercapto-substituted silane may be repeated and baked again, as desired.

The compositions and methods of this invention are particularly suitable for treating aluminum and aluminum alloys. The inventors have found that treating aluminum or aluminum alloys with the mercapto-substituted silane containing composition of this invention provides both increased corrosion resistance and enhanced adhesion of subsequent organic coatings to the treated surface.

DETAILED DESCRIPTION OF THE INVENTION

The inventors have found that the corrosion resistance of metal, particularly aluminum and aluminum alloys, can be greatly enhanced by applying a treatment solution comprising a mercapto-substituted silane, preferably followed by a bake dry and cure. The mercapto-substituted silane of this invention is preferably a multifunctional mercapto-substituted organic silane of the following chemical formula:

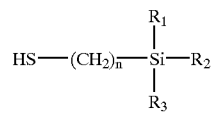

Wherein $R_1$, $R_2$ and $R_3$ are independently selected from the group consisting of alkoxy groups (e.g., methoxy, ethoxy, or similar alkoxy groups), alkyl groups and hydrogen groups, and wherein n is an integer from 0 to 10, but is preferably an integer from 1 to 4. A particularly preferred mercapto-substituted silane is gamma-mercaptopropyltrimethoxy silane which has the following structure:

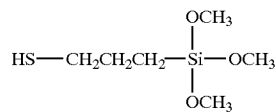

The inventors have found gamma-mercaptopropyltrimethoxy silane to be the most preferred mercapto-substituted silane for use in this invention. Gamma-mercaptopropyltrimethoxy silane is available from the Witco Corporation of Greenwich, Conn. under the tradename SILQUEST® A-189 Silane. Other useful mercapto-substituted silanes include (3-mercaptopropyl) methyl dimethoxy silane available from the Fluka Chemie AG of Buchs, Switzerland. The inventors have unexpectedly discovered that the mercapto group on these mercapto-substituted silanes provides significantly better corrosion protection than is provided by other silanes which do not have the mercapto substituted group. Thus, the inventors believe that the mercapto-substitution on the silane provides significant and unexpected improvements in corrosion protection and adhesion promotion in relation to non-mercapto-substituted silanes.

The mercapto-substituted silane is preferably solubilized, with a suitable solvent, into a treatment solution. The concentration of mercapto-substituted silane in the treatment solution may be from 0.5 to 10% by weight but is preferably from 2 to 4% by weight. Mercapto-substituted silanes, such as gamma-mercaptopropyltrimethoxy silane, may not be soluble in water alone to the extent necessary to practice this invention effectively. The inventors have discovered that a combination of water with an appropriate solvent are required to effectively solubilize these mercapto-substituted silanes in a water matrix. Appropriate solvents for this purpose include N-methyl-2-pyrrolidone, butyrolactone, diethylene glycol butyl ether, hexylene glycol, ethylene glycol monobutyl ether and alcohols. Most preferred as a solubilization matrix for the mercapto-substituted silanes is a combination of water and ethylene glycol monobutyl ether. Preferably, the mercapto-substituted silane is added to the solvent (e.g., ethylene glycol monobutyl ether) and then that mixture is added to the water, with stirring to form the treatment solution. The inventors have found that an aqueous solution of ethylene glycol monobutyl ether does an excellent job of solubilizing the mercapto-substituted silane and leaves behind a spot free finish as it evaporates from the treated surface. The concentration of solvent in the water must be adjusted in order to properly solubilize and/or maintain the mercapto-substituted silane in solution. The inventors have found that ratios of water to ethylene glycol monobutyl ether concentration, based on volume percentages of from 65/35 to 94/6 were suitable for mercapto-substituted silane concentrations of from 5 to 0.5 volume percent. The aqueous solution of the mercapto-substituted silane will hydrolyze the silane and will improve its effectiveness in treating the metal surfaces.

The pH of the treatment solution should be less than 7 and is preferably between about 3 and 5. The inventors have found that using an aqueous solution of the foregoing solvents and the mercapto-substituted silane, the treatment solution will naturally make up at a pH of about 4. Acetic acid can be used to make any needed adjustments to pH. The concentration of mercapto-substituted silane may range from 0.5 to 10 percent by volume, but is preferably from 2 to 5 percent by volume of the treatment solution. The concentration of mercapto-substituted silane in the treatment solution will affect the corrosion protection achieved, with better corrosion protection achieved at higher concentrations.

The process of this invention has been found to increase the corrosion resistance of metals generally, not including zinc and zinc plated surfaces, but is particularly effective on aluminum and aluminum alloys. Thus, the inventors have found this process to be especially useful on aluminum, and aluminum alloys such as 6061-T6 aluminum alloy, 2024-T3 aluminum alloy and 356 aluminum alloys.

The treatment solution is applied to the metal surfaces by immersion, spraying, flooding or other similar means of contact. Preferably, the contact occurs at room temperature and lasts for from 15 seconds to several minutes.

The inventors have found that it is important to dry and bake the treated metal after application of the mercapto-substituted silane in order to properly cure the silane coating on the metal surface. Baking may occur at from 60° C. to 300° C. for from several minutes to several hours, preferably at from 80° C. to 250° C. for from 20 minutes to 2 hours. However, the inventors have found that baking at a temperature of about 200° C. for about 1 hour provides optimum performance. Baking temperatures greater than or less than about 200° C. have been found to decrease the amount of corrosion protection achieved with the process.

The silane treatment solution of this invention can become unstable over time. As the silane becomes hydrolyzed by the water it will have a tendency to precipitate and the solution will begin to take on a white cloudy appearance. It is believed that this instability may also arise from the polymerization of the silane molecules in the solution to form 2 or 3 member chains. This potential instability can be controlled by increasing the concentration of solvent in the treatment solution before, or at the first sign of cloudiness. As a result of this potential instability, it may be useful to prepare a concentrated solution of the mercapto-substituted silane without water that is storage stable and is then added to water to prepare the treatment solution. In this regard, a storage stable concentrate of mercapto-substituted silane can be prepared by dissolving the silane in a solvent, such as ethylene glycol monobutyl ether, without water. For example, a concentrate of 90% by volume ethylene glycol monobutyl ether and 10% by volume gamma-mercaptopropyltrimethoxy silane can be prepared and is storage stable. A 20% by volume solution of this concentrate in water can then used as the treatment solution.

The metal is preferably cleaned, deoxidized and/or etched prior to contacting it with the treatment solution of this invention. Prior preparation of the metal surface generally increases the activity of that surface towards subsequent treatments, in this case, towards the mercapto-substituted silane treatment. As a result, prior preparation of the surface will generally yield better corrosion resistance results after treatment with the process of this invention. However, preferably the surface is not treated with any non-mercapto-substituted silanes, silicates, chromates or other conversion coatings prior to treatment with the mercapto-substituted silane. Preferably, the metal surfaces are cleaned and etched prior to treatment with the process of this invention. A variety of cleaners and etchants are known for preparing a variety of metal surfaces. For cleaning the surfaces of aluminum and aluminum alloys, both acid and alkali based cleaners are available. One preferred alkali based cleaner is ISOPREP 49L available from MacDermid, Incorporated of Waterbury, Conn. ISOPREP 49L is typically used at 10% v/v concentration with water at 150° F. for 2–5 minutes. A preferred acid based cleaner is ISOPREP 160 also available from MacDermid, Incorporated. ISOPREP 160 is typically used at 10% v/v concentration with water at 160° F. for 2–5 minutes. These aluminum cleaners are typically relatively weakly basic or acidic in comparison to the etchants.

Aluminum and aluminum alloys can be effectively etched using strongly acidic or strongly basic solutions. Two preferred etchants for aluminum and aluminum alloys include ISOPREP 161 and ISOPREP 35, both available from MacDermid, Incorporated. ISOPREP 161 is a strongly acidic etchant typically used at 10% v/v concentration with water at 140° F. for 30 seconds to 2 minutes. ISOPREP 35 is a strongly basic etchant typically used at 4 oz/gal concentration in water at 160° F. for 30 seconds for 2 minutes.

Although the inventors have found that treatment of the metal with a cleaner and an etchant prior to treatment with the mercapto-substituted silane of this invention generally improves the corrosion resistance provided by the process, the best choice of cleaners and etchants may depend upon the metal being treated. For instance, the inventors have found that strongly acid etchants work better on 6061-T6 aluminum alloy while strongly basic etchants work better on 2024-T3 aluminum alloy.

It is preferred that the metal surface be treated with the mercapto-substituted silane directly after the cleaning, deoxidizing, and/or etching process, without any intervening treatment with another type of silane or conversion coating. The inventors have surprisingly found that other silanes (i.e., non-mercapto-substituted silanes) do not provide nearly the same corrosion protection as the mercapto-substituted silanes of this invention and if the other silanes are applied prior to the mercapto-substituted silane, they may interfere with the mercapto-substituted silane's ability to effectively react with the surface and provide corrosion protection.

The corrosion resistance of a treated metal part is typically measured by exposing the treated metal part to a 5% by weight sodium chloride solution in a salt spray chamber. Corrosion resistance is measured as the maximum number of hours the part can endure before corrosion becomes apparent in a specified manner on its surface. Military specification MIL-C-5541D provides specific procedures for measuring the corrosion resistance of a treated part. ASTM B117 is another widely used specification for determining the corrosion resistance of a metal treated part with a salt spray procedure. Similar specifications, such as ASTM D-3359-87, have been prepared to test the adhesion of organic coatings to treated metal surfaces. These adhesion procedures usually include a cross-hatch tape test whereby the organic coating is cut in a specified cross-cut pattern and tape is applied and removed to determine the quantity, if any, of the organic coating that is removed.

The inventors have found that salt spray corrosion resistance in excess of 1,000 hours on 6061-T6 aluminum alloy and in excess of 350 hours on 2024-T3 aluminum alloy can be achieved with the process of this invention. In addition, excellent adhesion of organic coatings to the treated metal surfaces can be achieved with the process of this invention.

This invention is further described by the following examples which should be taken as illustrative only and not limiting in any manner:

EXAMPLE I

Samples of aluminum alloys 6061-T6 and 2024-T3 were processed through the following cycle by immersion:

| Treatment | Time (min) | Temperature |
|---|---|---|
| 1. 10% v/v ISOPREP 160[1] | 5 | 160° F. |
| 2. Water Rinse | 1 | room temp. |
| 3. 10% v/v ISOPREP 49L[1] | 5 | 150° F. |
| 4. Water Rinse | 1 | room temp. |
| 5. 50% v/v Nitric Acid | 1 | room temp. |
| 6. Water Rinse | 1 | room temp. |
| 7. Mercapto-Substituted Silane Treatment Solution | 1 | room temp. |
| 8. Bake | 60 | 200° C. |

[1]ISOPREP 160 and ISOPREP 49L are proprietary cleaning solutions for aluminum and aluminum alloys available from MacDermid, Inc. 245 of Waterbury, CT.

Each sample was then processed in a salt spray chamber according to the procedures set forth in ASTM B117 standard in order to determine corrosion resistance. The composition of the mercapto-substituted silane treatment solution and the corrosion resistance results are given below in Table I.

TABLE I

| Silane[2] (%/vol.) | Ethylene Glycol Monobutyl Ether (%/vol.) | Water (%/vol.) | Salt Spray Hours on 6061-T6 Aluminum | Salt Spray Hours on 2024-T3 Aluminum |
|---|---|---|---|---|
| 5 | 30 | 65 | >1000 | 384 |
| 4 | 25 | 71 | 1000 | 216 |
| 2 | 24 | 74 | 360 | 192 |
| 1.5 | 22 | 76.5 | 168 | 144 |
| 1.0 | 15 | 84 | 72 | not attempted |
| 0.5 | 6 | 93.5 | <24 | not attempted |

[2]Gamma - Mercapto-propyltrimethoxy silane

We claim:

1. A method of treating a metal to improve corrosion resistance, comprising contacting the metal with a treatment solution, which treatment solution comprises a mercapto-substituted silane and a solvent from the group consisting of N-methyl-2-pyrrolidone, butyrolactone, diethylene glycol butyl ether, hexylene glycol, ethylene glycol monobutyl ether, alcohols and mixtures of the foregoing, and thereafter baking the metal at a temperature ranging from 60° C. to 300° C.; wherein the pH of the treatment solution is between about 3 and 5.

2. A method according to claim 1 wherein the mercapto-substituted silane is a multifunctional mercapto-substituted silane having the following chemical structure:

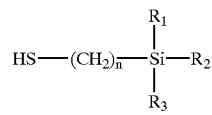

Wherein $R_1$, $R_2$ and $R_3$ are independently selected from the group comprising of alkoxy groups, alkyl groups and hydrogen, and wherein n is an integer from 0 to 10.

3. A method according to claim 1 wherein the metal is selected from the group consisting of aluminum and aluminum alloys.

4. A method according to claim 1 wherein the metal is baked, after contact with the treatment solution, at from 80° C. to 250° C.

5. A method according to claim 1 wherein the metal is subjected to a process selected from the group consisting of cleaning, deoxidizing, etching and a combination of the foregoing, prior to contacting the metal with the treatment solution.

6. A method according to claim 2 wherein the multifunctional mercapto-substituted silane is selected from the group consisting of gamma-mercaptopropyltrimethoxy silane, (3-mercaptopropyl) methyl dimethoxy silane, and mixtures of the foregoing.

7. A method according to claim 2 wherein the metal is selected from the group consisting of aluminum and aluminum alloys.

8. A method according to claim 2 wherein the metal is baked, after contact with the treatment solution, at from 80° C. to 250° C.

9. A method according to claim 2 wherein the metal is subjected to a process selected from the group consisting of cleaning, deoxidizing, etching and a combination of the foregoing, prior to contacting the metal with the treatment solution.

10. A method according to claim 1 wherein the solvent is ethylene glycol monobutyl ether.

11. A method according to claim 6 wherein the metal is selected from the group consisting of aluminum and aluminum alloys.

12. A method according to claim 6 wherein the metal is baked, after contact with the treatment solution, at from 80° C. to 250° C.

13. A method according to claim 6 wherein the metal is subjected to a process selected from the group consisting of cleaning, deoxidizing, etching and combination of the foregoing, prior to contacting the metal with the treatment solution.

14. A method according to claim 6 wherein the concentration of the mercapto-substituted silane in the treatment solution is from 0.5 to 10 percent by weight of the treatment solution.

15. A method according to claim 6 wherein the solvent is ethylene glycol monobutyl ether.

16. A process according to claim 1 wherein the temperature is about 200° C.

* * * * *